April 18, 1933.  C. T. RAY  1,903,836
SEED PLANTER
Filed Feb. 27, 1929
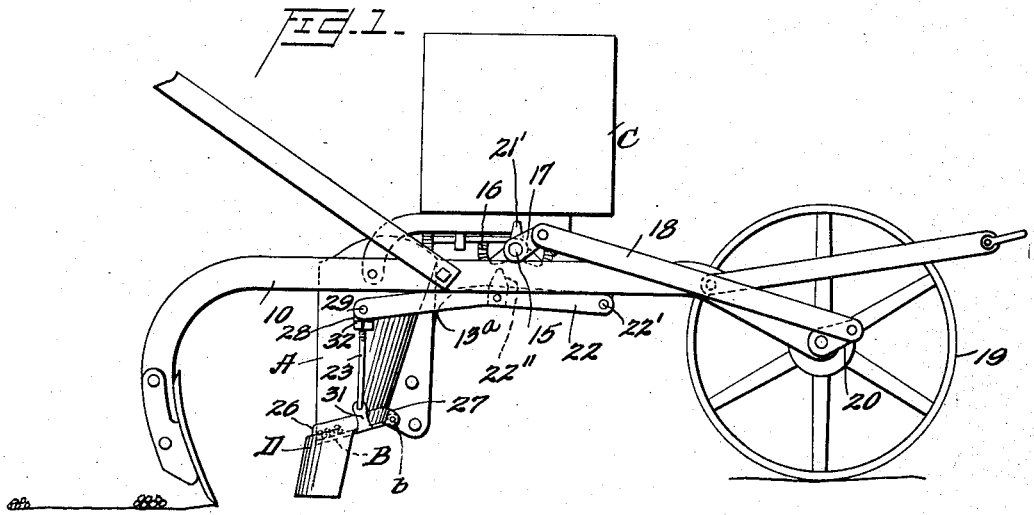
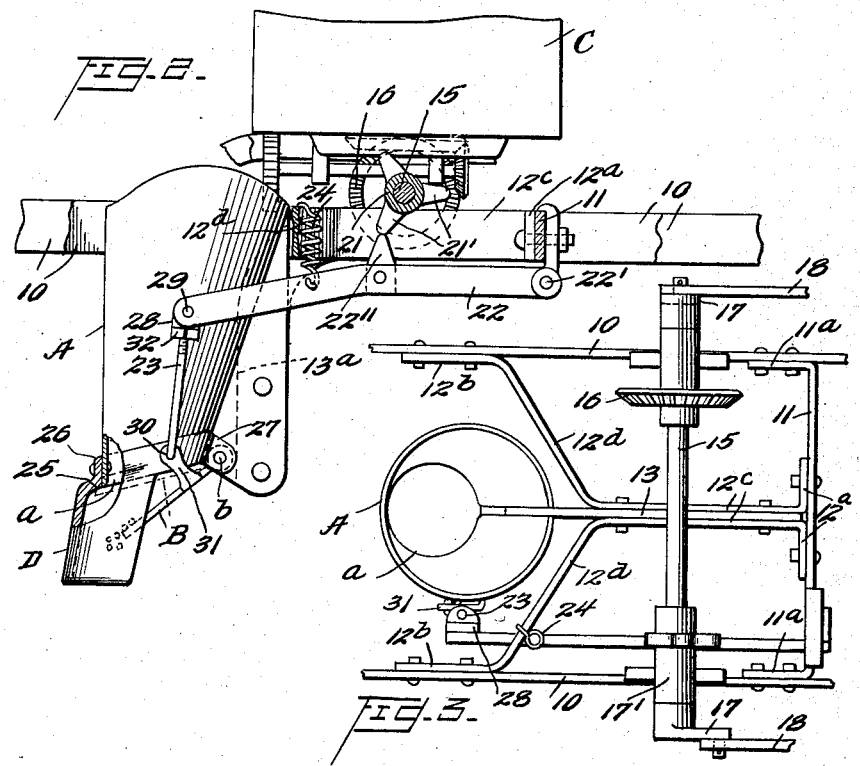
Inventor
Charles T. Ray,
By C. J. Stockman
Attorney Patented Apr. 18, 1933

1,903,836

UNITED STATES PATENT OFFICE

CHARLES T. RAY, OF LOUISVILLE, KENTUCKY, ASSIGNOR TO B. F. AVERY & SONS, OF LOUISVILLE, KENTUCKY, A CORPORATION OF KENTUCKY

SEED PLANTER

Application filed February 27, 1929. Serial No. 343,217.

Planters are commonly provided with seed hoppers, and with seed chutes or spouts, hereinafter for the sake of brevity referred to as "chutes", to conduct seed from the hoppers to the ground, and means under control of the travel of the planter for controlling the discharge of the seed. Moreover, it has been proposed to so correlate the parts which cause the seed to be supplied to the seed bed, that such delivery will be effected at intervals to thereby space the seed in the bed. To this end it has been proposed to provide the seed chute with a valve to control the discharge of the seed therefrom and to operate said valve at intervals such that there will be periods during which seed will accumulate in the chute while the valve is closed and the seed thus accumulated will be simultaneously discharged to the seed bed by the opening of the valve, all under control of the travel of the planter.

This invention primarily relates to and consists of, certain improvements in the means hitherto proposed for operating said valve under control of the travel of the planter, the improvements being designed to assure by simple and practicable means, not liable to get out of order, the opening and closing of the valve quickly and positively, at regular intervals in proper timed relation to the operation of the means by which seeds are supplied to the valve, and the simultaneous and positive discharge from the chute, each time the valve is opened, of the seed which has accumulated in the chute; thereby eliminating all uncertainty in respect of proper operation of the parts in their intended timed relation and also assuring that there will be no waste of seed, such as would be caused by a sluggish or retarded movement of the valve in opening and closing or sluggish or retarded flow of the seed from the chute when the valve commences to open.

The invention more particularly defined relates to and consists of, certain novel combinations and correlations of a seed hopper having a seed dropping mechanism therein, a seed chute to receive the seed from said mechanism and provided with a valve to control the discharge of the seed to the seed bed, valve-operating connections including a tensioned lever pivoted to the frame of the planter, and an operating shaft which derives motion from the travel of the planter and is provided with a gear to continuously operate the seed dropping mechanism of the hopper and with a member to intermittently operate the tensioned lever forming part of the valve-operating connections.

In the preferred embodiment of the invention, the tensioned lever which forms a part of the valve-operating connections has one of its ends connected by a link with the valve and is pivoted at its other end to the frame of the planter and is provided intermediate its ends with a lug or projection; the means on the operating shaft to operate said lever is a rotative member or cam which is removably fixed to said shaft and is provided with spaced projections (or "high spots") arranged successively to engage said projection on the lever and thereby operate the lever intermittently, at intervals in the rotation of the operating shaft predetermined by the number and spacing of the projecting portions or high spots on the rotative member or cam; the valve when closed extends at a downward inclination from its pivoted end across the discharge end of the chute to cause the seed deposited thereon to collect upon its lowest part and thereby be immediately discharged over the lower edge thereof as soon as the valve commences to open; a shield is provided below the discharge end of the chute and in such relation to the edge of the valve over which the seed flows from the chute to the seed bed that deposition of the seed within a restricted area at each opening of the valve will be assured; and the link which connects the lever with the valve is of a nature which permits its length to be readily varied to thereby correspondingly vary the throw of the valve.

The term "planter" wherever used in this specification without particular definition as to kind or style is intended to include all planters, both walking and riding, and listers and the like, which commonly include a seed hopper and seed dropping mechanism under control of the travel of the "planter". Moreover, while it is preferred that the seed dropping mechanism hereinbefore referred to be arranged as a part of the hopper, yet the invention in its broader aspects is not restricted to that particular arrangement since it is necessary only that there should be a regular deposit of seed upon the valve which controls the discharge of seed from the chute in such relation to the intervals at which said valve is opened, both under control of the travel of the planter, that there will be an accumulation of seed to be simultaneously discharged at each opening movement of the valve: and this may be accomplished by suitable seed dropping mechanism arranged at any appropriate place in advance of the valve which controls the discharge of the seed from the chute.

In the accompanying drawing wherein like letters of reference indicate corresponding parts in the several views:

Fig. 1 is a side elevation of part of a hand planter of a well known construction, and shows the parts in the positions they occupy when the valve which controls the flow of seeds from the seed chute is closed;

Fig. 2 is a view, partly in vertical section and partly in elevation, of a part of a planter having a seed-dropping mechanism of a particular kind selected for illustrative purposes; and Fig. 3 is a plan view of the parts shown in Fig. 2 but with the seed hopper omitted.

The frame of the planter which has been selected for illustrative purposes includes two side members 10, 10, a forward transverse member 11 whose ends are secured to said side members, respectively, as shown at 11ª, 11ª, and two brace members whose forward ends lie against and are secured to the transverse member 11, as shown at 12ª, 12ª and whose rear ends lie against and are secured to the members 10, 10 as shown at 12ᵇ, 12ᵇ. Between their said ends the brace members extend rearwardly and parallel with each other and in a spaced relation— as shown at 12ᶜ, 12ᶜ—and thence divergently outward—as shown at 12ᵈ, 12ᵈ—to their respective end portions 12ᵇ, 12ᵇ. A member 13 is arranged between the portions 12ᶜ of the brace members and is secured thereto and has its rear end extending downward, as shown at 13ª, to serve as a support for the seed chute A and also as a means to which a furrow opener may be attached. It will be understood that such openers are commonly employed in planters to form the seed bed and that they are of various types. Since this invention is not restricted to any particular kind or type of such opener it is regarded as unnecessary to illustrate any opener herein. The seed chute A is of any suitable construction adapted to cause all of the seeds supplied to said chute to be directed toward a restricted outlet a forming the discharge opening of the chute. It is, of course, suitably closed along its front side from its top to said discharge opening, and it is provided adjacent its discharge opening with a valve B which when closed extends rearward at a downward inclination. This valve is pivoted at its forward end, as shown at b and is opened downwardly under control of the travel of the planter by means which constitute an important part of this invention and which means will be presently described.

C designates the seed hopper from which seed are supplied in more or less regular succession to the seed chute A. This supply of seed is commonly controlled in planters by means of an appropriate seed-dropping mechanism which usually forms a part of the hopper. Since the instant invention is not restricted, considered in broad aspects, to any particular construction of seed dropping mechanism and since many such are known in the art, it is unnecessary to illustrate or to describe a particular construction of such mechanism in this application. It may, however, be here mentioned that a suitable means for the purpose is illustrated and described in Patent No. 1,171,882, issued February 15, 1916 for a planter invented by me and assigned to B. F. Avery & Sons of Louisville, Kentucky, a corporation of Kentucky, to which reference may be made for information as to the particular seed dropping mechanism preferably employed in the particular planter selected for illustrative purposes in relation to the instant invention.

The patent referred to shows a transverse shaft which corresponds to the shaft 15 shown in the drawing forming part of this application and also shows a gear which corresponds to the gear 16 and serves to transmit motion to the seed dropping mechanism. The said shaft has its outer ends provided with cranks 17, 17 connected by pitmen 18, 18 with crank arms mounted on the ends of the axle of the drive wheel 19, one of the latter crank arms being shown at 20 in Fig. 1.

It will be understood that in the operation of the planter the shaft 15 is continuously rotated through the medium of the ground engaging supporting wheel 19, the shaft or axle of said wheel, the crank arms 20 and 17 and the pitmen 18; and that the seed dropping mechanism is operated by said shaft 15 and its gear 16 and causes a regular supply of seed from the hopper to the seed chute. It will also be understood that the seed which has been thus supplied to the seed chute drops upon the rear lowermost edge of the valve B, when the latter is closed. In the operation of the planter this valve remains in closed position until several of the seed have been supplied to and permitted to collect upon its rear lowermost portion and is then automatically opened, whereupon the seed which have thus collected upon its lowermost portion will instantaneously flow from the chute and over the rear edge of the valve and onto the seed bed. The valve is then closed automatically.

In order that the valve may be opened in a proper timed relation with the operation of the seed dropping mechanism and may be closed promptly when the seed which have collected upon it have been discharged, I have provided means of improved nature which like the seed dropping mechanism is under control of the travel of the planter and which operates efficiently and promptly. This valve operating means comprises a rotative member 21 having equi-spaced projections 21'; an arm or lever 22 pivoted at one end, as shown at 22', to an appropriate part of the frame of the structure and having its other end connected by a link 23 with the valve B and provided between its ends with a lug 22'' to be engaged by the projections 21' of the rotative member 21; and a spring 24 which is connected to the arm or lever 22 and to a suitable part of the frame of the structure and maintains the arm or lever, and also the link and the valve, under tension which holds the valve B in its closed position, shown in dotted outline in Fig. 2, at all times except when the projections 21 are in operative engagement with the lug 22''. The member 21, in the illustrated embodiment, is fixed upon the shaft 15 and the number of its projections 21' determines the intervals in the rotation of the wheel 19, and hence of the shaft 15, at which the valve B will be opened.

In order that these intervals may be varied, it is preferred in practice to provide for each planter a plurality of members 21 having varying numbers of projections 21' to thereby adapt the planter to the planting of seed at corresponding different distances apart, and to provide for convenient interchange of such members 21. This interchange in the present structure may be conveniently effected by removing the crank arm 17 at one end of the shaft 15 and also by removing the sleeve 17' between said crank arm and the member 21. The selected member 21 may then be mounted upon its shaft 15, whereupon the sleeve 17' and the crank arm 17 are replaced and serve to hold the member 17 against lateral displacement upon the shaft.

It will be noticed that the valve B is held in closed position and the lug 22'' is held in position to be engaged by the projection 21' next adjacent to said lug, both under tension of the spring 24 exerted upon the arm or lever 22; and that in the operation of the planter rotation of the member 21 will cause its projections 21' successively to engage the lug 22'' and thereby cause the arm or lever 22 to be moved intermittently against the tension of the spring and by its said movement to open the valve B and cause an intermittent discharge of the seed from the seed chute.

In order to confine the seed being discharged from the chute against excessive scattering tendency, a mouth piece or shield D is provided at the lower end of the chute. This member D is formed to encircle the rear (discharge) portion of the valve and is also formed with a shoulder 25 against which said portion of the valve is seated when closed. It is here shown as having a collar 26 at its upper end and this collar is suitably fastened at the lower end of the chute A and is provided at its forward side with lugs 27 through which the pivot $b$ of the valve B extends, said valve being thereby carried by the collar and hence being a unit with the shield or mouth piece. This is advantageous since it enables the shields or mouth pieces and the corresponding valves to be assembled as units for attachment to chutes which form parts of planters not originally intended particularly for the planting of the seed in spaced relationship but adaptable to such planting by application thereto of discharge valves and suitable operating mechanisms for said valves, respectively.

The link 23 is preferably formed to permit its length to be adjusted in accord with the throw intended for the valve B. This adjustment may be conveniently provided for by threading the upper end of the link and extending the said upper end through a trunnioned nut or sleeve 28 pivoted at 29 to the rear end of the lever 22 thus enabling the distance between the pivots 29 by which the upper end of the link is connected to said lever and the pivot 30 by which the lower end of the link is connected to a lug 31 which forms a part of the valve B to be varied. A clamping nut 32 is preferably employed to fix the link against longitudinal movement relatively to the lever 22 and nut or sleeve 28 when adjustment has been effected.

Having thus described the invention what I believe to be new and desire to secure by Letters Patent, is:

1. A seed distributing machine including, in combination, a wheel-supported frame, a seed chute, means for supplying seed to the chute, a valve to control the discharge of seed from the chute, a substantially horizontally tensioned lever pivotally connected at one end to the frame and having a projection intermediate its ends, a connection between the other end of the lever and the valve, and a rotative member operated under control of the travel of the machine and having spaced projecting portions in operative relationship with the projection from the lever to operate the latter intermittently.

2. The combination, in a seed distributing machine with a frame, a ground engaging supporting wheel for the frame, an operating shaft, connections between said shaft and the supporting wheel to rotate the shaft, a seed hopper, seed dropping mechanism, a seed chute to conduct toward the ground the seed discharged by said mechanism, and means operated by the shaft to operate said mechanism, of a valve to control discharge of seed from said chute, and means to open said valve in a timed relationship with the operation of the seed dropping mechanism, including a tensioned lever pivotally connected to the frame and having a projection, a rotative member fixed on said shaft and having a projection to engage the projection from said lever, and a connection for transmitting movement from the lever to the valve.

3. The combination, in a seed distributing machine with a frame, a seed hopper, a seed chute, seed dropping mechanism in operative relationship with the hopper and chute, a valve to control the discharge of the seed from the chute, and an operating shaft whose motion is derived from the travel of the machine, of a tensioned lever pivotally connected to the frame and extending longitudinally thereof, a connection between one end of said lever and the valve to transmit movement from the lever to the valve, and means on said shaft respectively operative to operate the seed dropping mechanism and lever in a relationship timed to permit accumulation of seed upon the valve in the interim between each opening movement of the latter.

4. The combination, in a seed distributing machine with a frame, a seed hopper, a seed chute, seed dropping mechanism in operative relationship with the hopper and chute, a valve to control the discharge of the seed from the chute, and an operating shaft whose motion is derived from the travel of the machine, of a tensioned lever extending longitudinally of and pivotally connected at one end to the frame and provided intermediate its ends with a projection, means under control of said shaft and having spaced projections to successively engage said projection from the lever and thereby operate the lever, means to transmit movement from the lever to the valve, and means, also under control of said shaft, to operate the seed dropping mechanism to cause a plurality of seed to be dropped thereby in the interim between each opening movement of the valve.

5. A seed distributing machine including a seed chute, provided with a valve to control discharge of seed therefrom and with a shield to prevent scattering of the seed discharged from the chute, said shield having a member which embraces and is secured to the chute and projects forward from the latter and to which the valve is pivoted, the shield also having a downwardly extending forwardly open portion within which the valve operates.

6. A seed distributing machine including, in combination, a supporting frame provided with a downwardly extending standard, a seed chute carried by said standard and having its lower end provided with a downwardly extending forwardly open shield, and means to control the supply of seed to the chute and the discharge of the same from the shield in a timed relation with each other under control of the travel of the machine.

7. A seed distributing machine including, in combination, a supporting frame provided with a downwardly extending standard, a seed chute carried by said standard and having its lower end provide with a downwardly extending forwardly open shield, and means to control the supply of seed to the chute and the discharge of the same from the shield in a timed relation with each other under control of the travel of the machine, including a valve mounted to operate within the forwardly open part of the shield.

8. A seed distributing machine including, in combination, a supporting frame provided with a downwardly extending standard, a seed chute carried by said standard and having its lower end provided with a downwardly extending forwardly open shield, and means to control the supply of seed to the chute and the discharge of the same from the shield in a timed relation with each other under control of the travel of the machine, including a valve mounted to operate within the forwardly open part of the shield, an operating lever for the valve, extending longitudinally of and pivotally connected at one end to the frame, means to intermittently operate said valve, and a link connecting the other end of the lever to the valve.

9. A structure according to claim 8 and wherein the valve is pivoted at one end to the standard and the link is connected to the valve intermediate the ends of the latter.

10. A seed distributing machine including, in combination, a supporting frame provided with a downwardly extending standard, a seed hopper, a seed chute carried by the standard and having its upper end in position to receive seed discharged from the hopper, a seed dropping mechanism to control the discharge of seed from the hopper to the chute, a downwardly extending forwardly open shield having its upper end embracing the lower end of the chute and projecting thence forwardly into engagement with the standard, said shield formed to provide a valve seat at the discharge end of the chute, a valve having one of its ends pivotally connected to the standard and forwardly projecting portion of the shield and having its other end arranged to operate within said shield and to engage said valve seat, and an operating mechanism for said valve, deriving motion from the travel of the machine.

11. A seed distributing machine, comprising, in combination, a wheel supported supporting frame, a seed chute, a valve to control the discharge of seed from the chute, and mechanism under control of the travel of the machine to control the supply of seed to the chute and the operation of the valve in a timed relation with each other, said mechanism including a substantially horizontal valve operating lever pivoted at one end to the frame, a connection between the opposite end of the lever and the valve, a member engaging the lever between the ends of the latter and operating thereon to move the valve intermittently in one direction and a tensioning spring to move the lever and valve in the opposite direction, said spring connected at one end to the frame and at its other end to the lever at a point intermediate said member and the connection between the lever and the valve.

12. A seed distributing machine comprising a wheel supported frame, a seed chute, and means for supplying seed to said chute, supported by the frame, a valve to control the discharge of seed from the seed chute, a valve operating lever extending longitudinally of the frame and having its forward end pivoted thereto, a link connecting the rear end of said lever with the valve, a tensioning spring having one of its ends connected to the frame and its other end connected to the lever, and means under control of the travel of the machine for operating said lever in opposition to the spring, said means including a member engaging the lever between the ends of the latter.

In testimony whereof I affix my signature.

CHARLES T. RAY.